United States Patent [19]
Jao

[11] Patent Number: 6,166,678
[45] Date of Patent: Dec. 26, 2000

[54] FOURIER-TRANSFORM-BASED ADAPTIVE RADIO INTERFERENCE MITIGATION

[75] Inventor: Jen King Jao, Wayland, Mass.

[73] Assignee: The United States of America as represented by the Secretary of the Air Force, Washington, D.C.

[21] Appl. No.: 09/389,734

[22] Filed: Sep. 7, 1999

[51] Int. Cl.$^7$ .............................. G01S 7/292; G01S 13/90
[52] U.S. Cl. .............................. 342/25; 342/99; 342/152; 342/159; 342/192; 342/194; 342/196
[58] Field of Search .................................. 342/25, 89, 91, 342/92, 93, 98, 99, 102, 151, 152, 159, 161, 162, 192, 194, 195, 196

[56] References Cited

U.S. PATENT DOCUMENTS

| | | | |
|---|---|---|---|
| 5,120,997 | 6/1992 | Cantwell | 327/79 |
| 5,831,570 | 11/1998 | Ammar et al. | 342/26 |
| 5,886,662 | 3/1999 | Johnson | 342/25 |
| 5,923,278 | 7/1999 | Poehler et al. | 342/25 |
| 6,011,505 | 1/2000 | Wright et al. | 367/11 |
| 6,018,317 | 1/2000 | Dogan et al. | 342/378 |
| 6,046,695 | 4/2000 | Poehler et al. | 342/25 |

OTHER PUBLICATIONS

"A bandpass /spl Sigma//spl Delta/ modulator with 92 dB SNR and center frequency continuously programmable from 0 to 70 MHz", Raghavan, G.; Jensen, J.F.; Walden, R.H.; Posey, W.P., Solid–State Circuits Conference, 1997. Digest of Technical Papers. 43rd IS.

"An extended phase–locked loop for clock synchronization applications", Gameiro, A.; Global Telecommunications Conference, 1994. GLOBECOM '94. Communications: The Global Bridge., IEEE, vol. 2, 1994, pp.: 956–961 vol. 2, 1997.

*Primary Examiner*—John B. Sotomayor
*Attorney, Agent, or Firm*—William G. Auton

[57] ABSTRACT

A signal process is provided for radar interference mitigation in SAR data and to perform several functions. Initially, the algorithm separately removes the average range bias of the I-channel and the Q-channel data. Next, I- and Q-channels are equalized by properly compensating their phase difference and gain imbalance due to either constant or random timing jitters. The current implementation well compensates relative I/Q timing jitters within two sampling time intervals which, for the FOPEN III receiver, are 4 nanoseconds. Graceful performance degradation of the algorithm is expected when timing jitter exceeds two sampling intervals. For example, phase jitter on the order of 5 sampling intervals will be partially but not perfectly corrected. Following the I/Q equalization, adaptive RFI rejection is performed. The FOPEN III data bandwidth may also be reduced 50% with hardly any information loss. The operation is allowed principally because of over-sampling; the FOPEN III A/D rate of 500 MHz exceeds the receiver bandwidth of 200 MHz by more than a factor of 2.

2 Claims, 11 Drawing Sheets

FOURIER-TRANSFORM-BASED ADAPTIVE RADIO INTERFERENCE MITIGATION

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to noise suppression systems, and more specifically the invention pertains to an adaptive noise cancellation technique for Radio Frequency Interference (RFI) mitigation. The proposed technique is applicable to eliminate RFI tones in SRI FOPEN II or III wide-band data sets before SAR image processing.

Wide-band SAR, such as SRI FOPEN II and III radars, are generally susceptible to RFI degradation due to abundant radio and TV emitters operating in the radar bands. Due to the strong intensity of RFI sources and one-way propagation from the source to the radar receiver, RFI may seriously contaminate the quality of high-resolution SAR images. The mitigation of RFI is difficult, particularly, when auxiliary RFI data are not adequately sampled to provide the opportunity of applying established noise cancellation techniques.

SUMMARY OF THE INVENTION

The present invention is a process for adaptive radar interference mitigation that correct for I and Q phase misalignment and jitter.

The first step entails reception of I and Q radar data, and processing by a bias removal step. The mathematics of these operations are discussed below.

Initially, the algorithm separately removes the average rage bias of the I-channel and the Q-channel data. Next, I- and Q-channels are equalized by properly compensating their phase difference and gain imbalance due to either constant or random timing jitters. The current implementation well compensates relative I/Q timing jitters within two sampling time intervals which, for the FOPEN III receiver, are 4 nanoseconds. Graceful performance degradation of the algorithm is expected when timing jitter exceeds two sampling intervals. For example, phase jitter on the order of 5 sampling intervals will be partially but not perfectly corrected. Following the I/Q equalization, adaptive RFI rejection is performed. The FOPEN III data bandwidth may also be reduced 50% with hardly any information loss. The operation is allowed principally because of over-sampling; the FOPEN III A/D rate of 500 MHz exceeds the receiver bandwidth of 200 MHz by more than a factor of 2.

DETAILED DESCRIPTION OF THE PREFERRED EMBODIMENT

Our routine RFI suppression approach is based on amplitude clipping or limiting. This approach identifies strong RFI frequencies and subsequently eliminates all RFI tonal component from the SAR data spectra. Previous experience demonstrates moderate success with this approach in spite of its Ad Hoc nature and lack of assurance for consistent results. Other approaches, such as a "Maximum Likelihood" method, have been proposed but their theoretical details are unknown and a working algorithm is unavailable to us at this time.

In the following discussion, an alternative RFI rejection technique will be defined to specifically handle SRI FOPEN data sets. This technique has been tried on about ten FOPEN III data sets gathered on Jul. 23, 1995 in the Yuma-2 test. The results suggest that the proposed technique is both effective and efficient.

Adaptive interference cancellation typically requires interference samples observed through an auxiliary receiver channel. There is no auxiliary channel built in the SRI FOPEN radar. However, in data gathering, SRI FOPEN radar receiver often records data in a range window starting before the radar nadir return and spans several mircoseconds afterward. Thus, before a radar pulse hits the ground nadir, the pre-nadir data are essentially interference samples which may be used to train the interference statistics for RFI cancellation. This realization helps the development of the following RFI rejection scheme.

Consider two radar data sets, $X_n(f)$ and $Z_n(f)$, which respectively represent the recorded pre- and post- nadir data segments during a range window in the nth pulse interval, $n=1, 2, \ldots$ Here, $Z_n(f)$ is assumed to be the sum of a signal, which is either target or clutter, $S_n(f)$, and the noise or interference component, $N_n(f)$; whereas, $X_n(f)$ is taken as the nth observation of the interference, $N_n(f)$:

$$Z_n(f)=S_n(f)+N_n(f); n=1,2, \ldots N$$

Since all processing will be carried out in the frequency domain the notation, $X_n(f)$ and $Z_n(f)$, denote the complex spectra of data and noise segment at a frequency index f. Using the well known result of adaptive processing, the optimal signal estimate, $S_n(f)$, is obtained by subtracting the interference estimate $W(f)X_n(f)$ from the data, $$S_n(f)=Z_n(f)-W(f)X_n(f); n=1,2, \ldots N$$

In this linear filtering scheme, the spectral weighting function $W(f)$ is calculated from the sample cross-correlation spectrum of $Z_n(f)$ and $X_n(f)$, averaged over N pulse intervals:

$$W(f) = \frac{E[Z(f)X(f)^*]}{E[|X(f)|^2]};$$

$$E[Z(f)X(f)^*] = \frac{1}{N}\sum_{n=1}^{N} Z_n(f)X_n(f)^*;$$

$$E[|X(f)|^2] = \frac{1}{N}\sum_{n=1}^{N} |X_n(f)|^2; \quad n=1, 2, \ldots N.$$

Sample Results

Figure 1A:
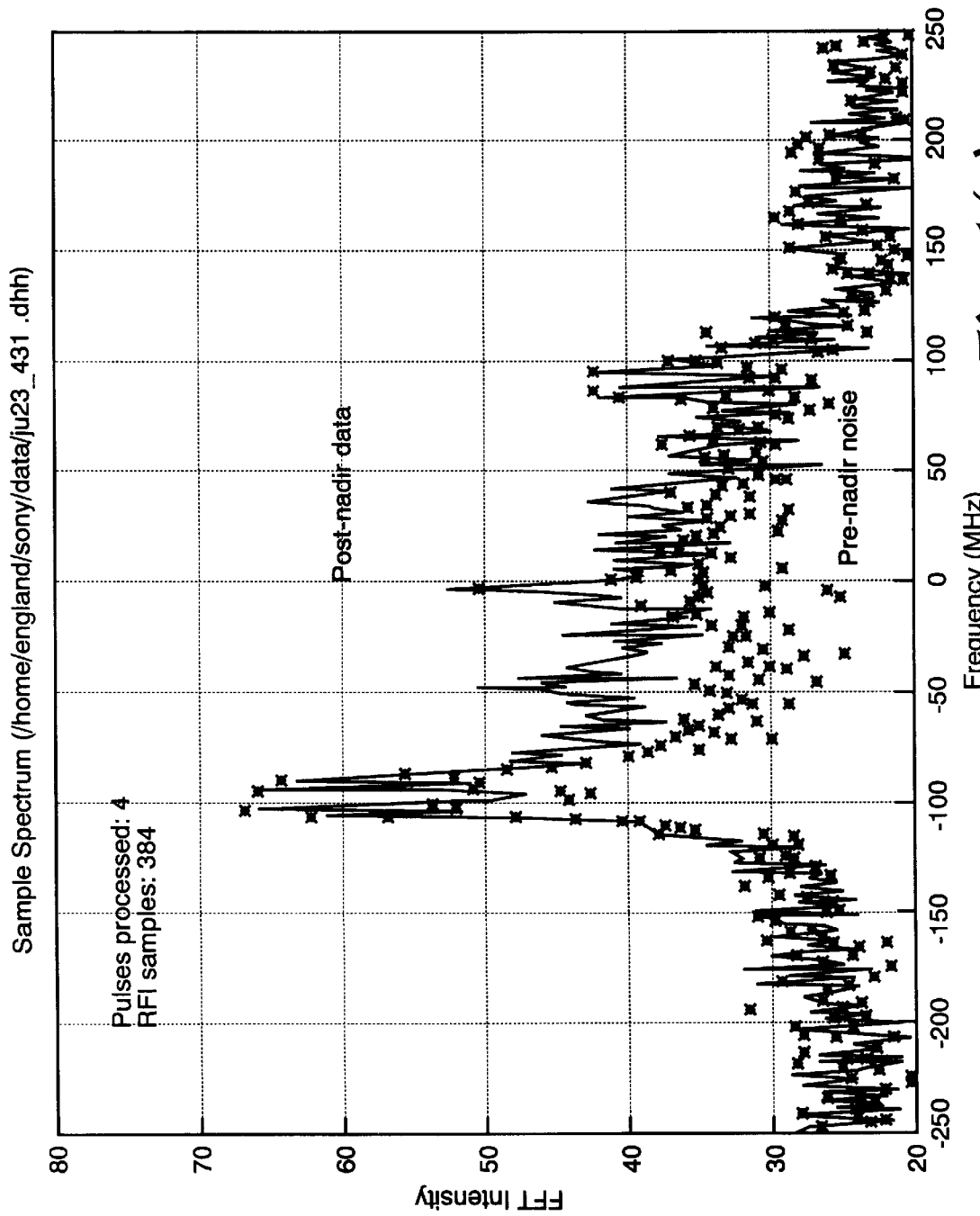
FIGS. 1a and 1b are charts of FOPEN III radar data.
Figure 1B:
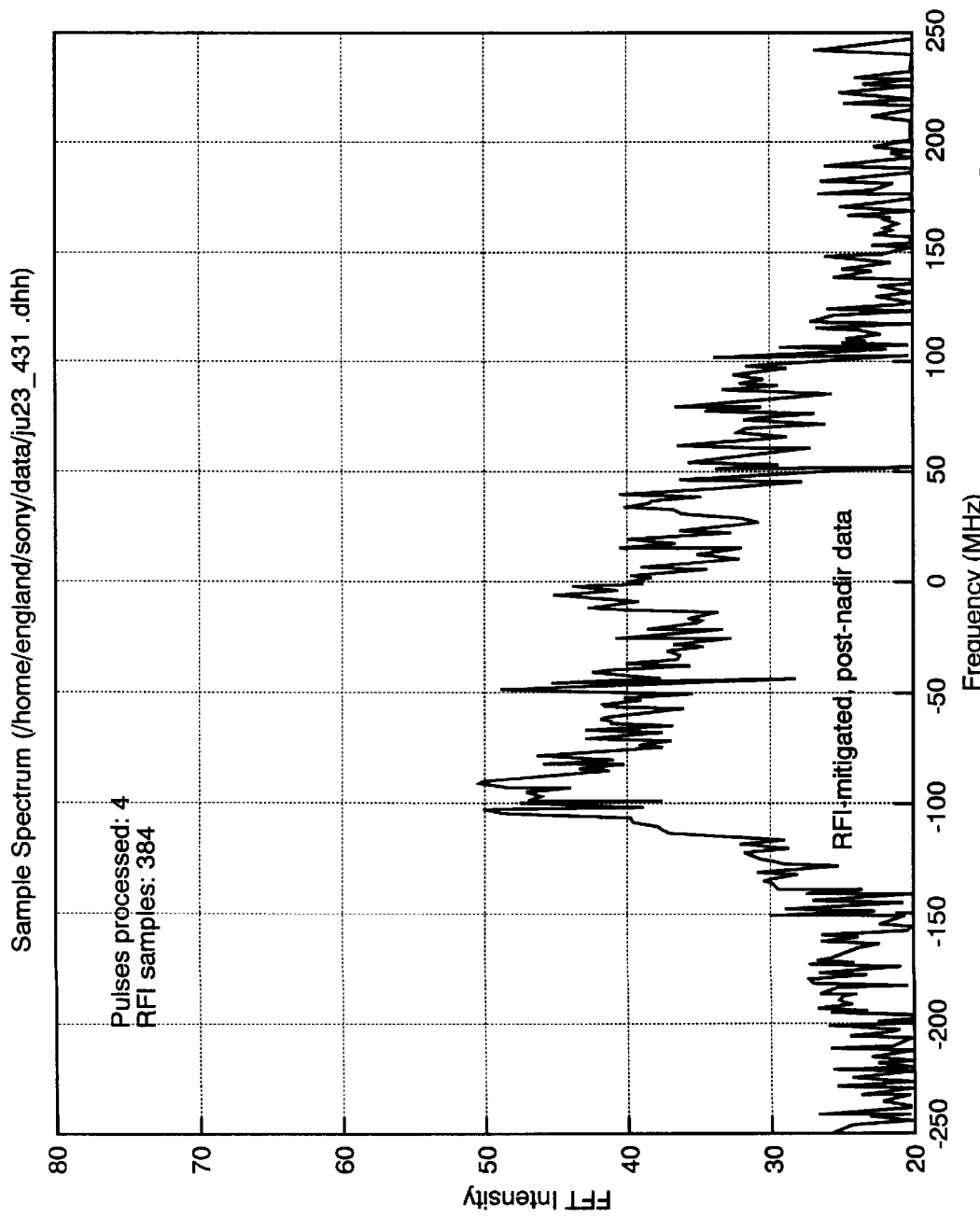

An example of RFI rejection, processed from the FOPEN II data set gathered in Yuma illustrated by FIGS. 1(a) and 1(b). In FIG. 1(a), the spectrum of a post-nadir (clutter or target) data of 384 range samples is plotted in solid line. In the same figure, spectrum of a pre-nadir interference data segment of the same length is superimposed as the star-marked curve. Using the process defined by (1) and (2), the RFI rejected post-nadir data spectrum is plotted in FIG. 1(b).

Figure 2A:
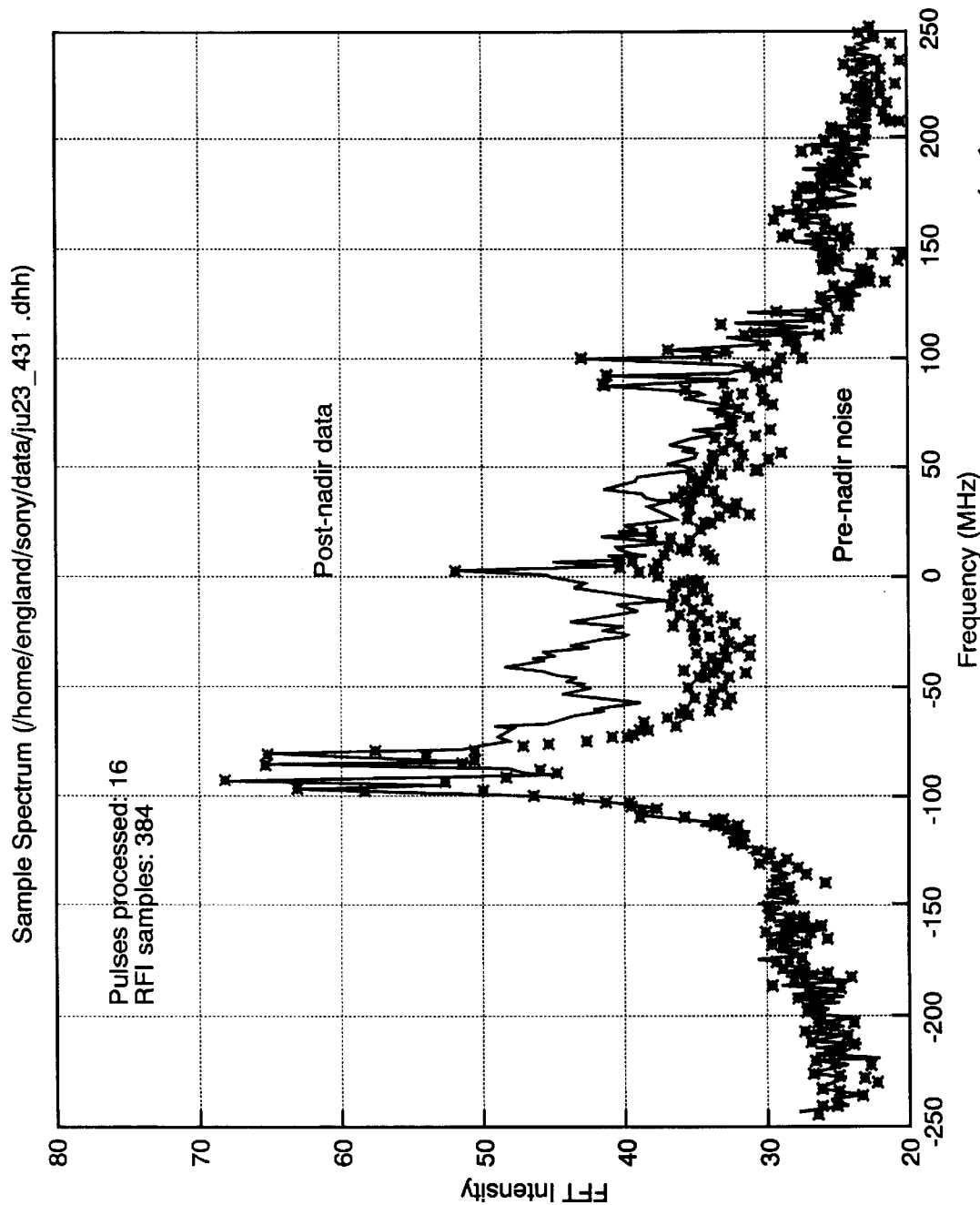
FIGS. 2a and 2b are charts of FOPEN III radar data after weighting.
Figure 2B:
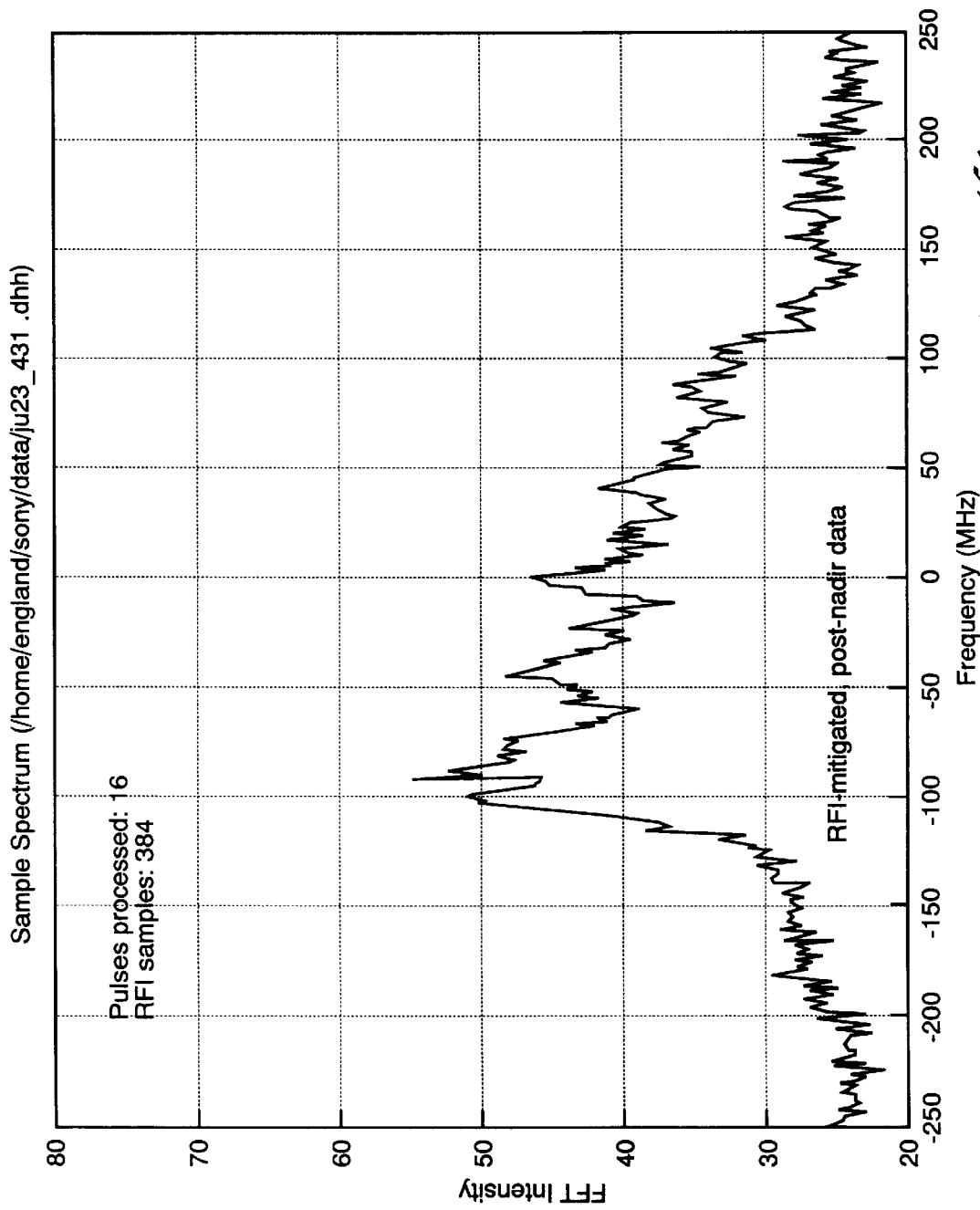

In this example, the interference statistic, as exemplified by the weight function W(f), is trained over 4 pulse intervals. The result of a similar example using the same data set but with W(f) trained over 16 pulse intervals is illustrated by FIGS. 2(a) and 2(b). Note that, almost all RFI tones have been suppressed.

Generally, RFI suppression on the order of 10 to 15 dB have been achieved. The success of the above adaptive noise cancellation technique depends critically on the faithful representation of the noise process $N_n(f)$, imbedded in the data $Z_n(f)$, by the observed noise $X_n(f)$. Note that, if the radar is operated at a fixed PRF of 200 Hz, then 4-pulse intervals would have spanned 20 milliseconds. Thus, using the statistic trained over 4-pulse intervals, the adaptive algorithm will effectively cancel interference which is stationary within 20 milliseconds, corresponding a bandwidth of 50 Hz.

For this reason, the adaptive interference scheme, as applied to the SRI FOPEN data sets, may be used to suppress "stationary" RFI tones but not interference which fluctuates over a large bandwidth. To mitigate "fast", fluctuating interference, an auxiliary interference channel, which is well-correlated with the data channel, must be sampled at a fast rate commensurate with the interference bandwidth.

Lately, several problems of the FOPEN III data have been identified and confirmed by SRI personnel. In addition to high RFI content, data streams recorded by the FOPEN III receiver typically exhibit symptoms of unbalanced I- and Q-charnels and timing errors. There uneven bias and gain between I- and Q-channels; the bias may vary from pulse to pulse and "ring" through a range sampling interval as expected from under-damped oscillation. Occasionally, the FOPEN III A/D device also shows sporadic instability.

A serious FOPEN III defect is timing jitter between I- and Q-channel outputs. The timing error seriously corrupts radar data coherency and degrades the FOPEN III sensitivity. In the last two months, Tom Bryant and Chuck Lee uncovered time misalignment error in units of whole range samples. Further investigation also revealed that, the timing error between the I- and Q-channels did not necessarily stay constant; the error or jitter of one pulse could actually differ from others. Given a recorded data set, the timing error of more than 90% of its data samples could be corrected within about 20% by shifting the range indices of the I-samples relative to the Q samples. However, there were random occurrences of large timing jitters in units of several samples and random fluctuation in timing from pulse to pulse could be a few percents.

Figure 3:
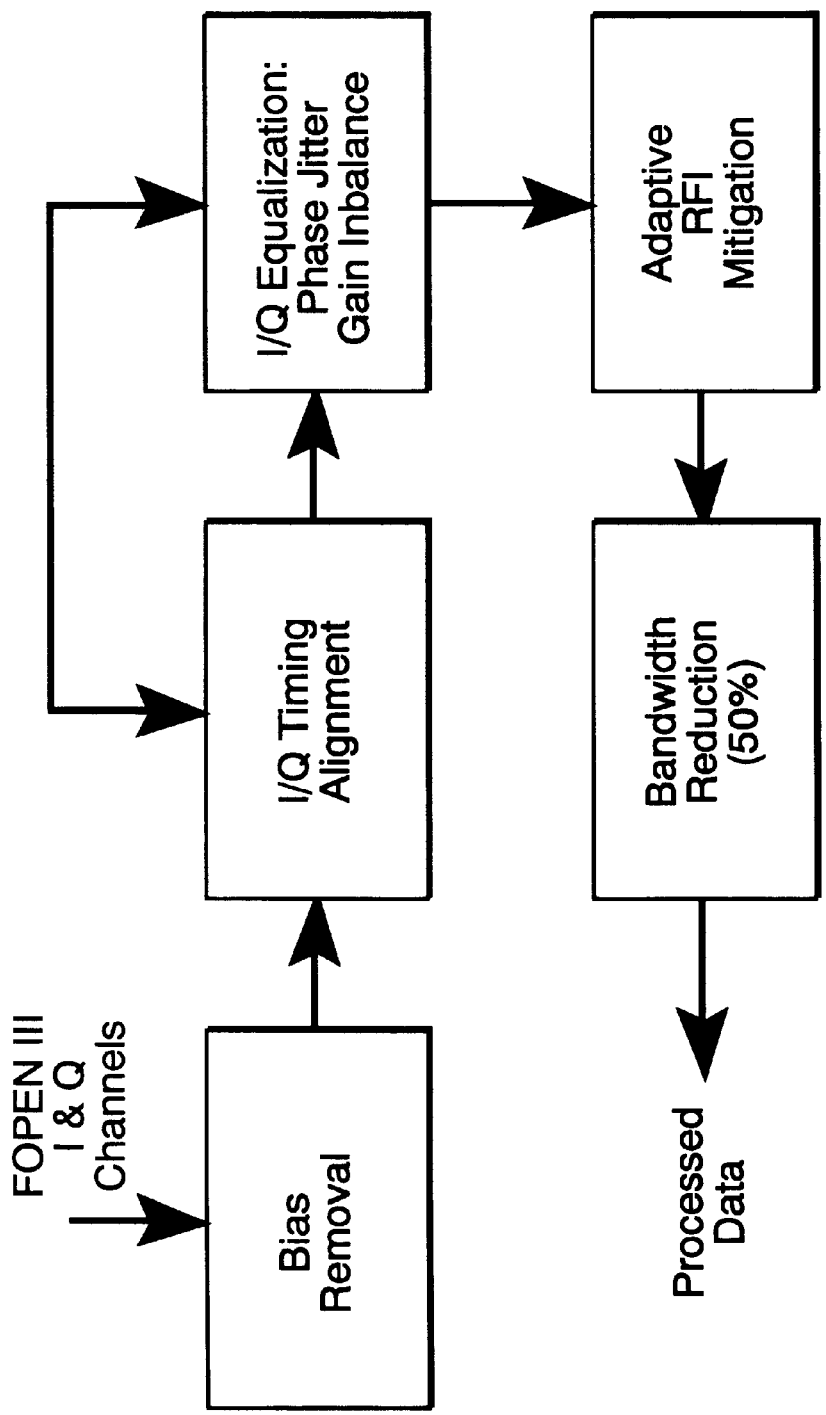
FIG. 3 is a block diagram of the process of the present invention.

The desire to improve the measurement sensitivity of FOPEN III SAR image has prompted the development of an algorithm to correct the above defects. The signal processing procedures, illustrated by the block diagram in FIG. 3, sequentially perform several functions. Initially, the algorithm separately removes the average range bias of the I-channel and the Q-channel data. Next, I- and Q-channels are equalized by properly compensating their phase difference and gain imbalance due to either constant or random timing jitters. The current implementation well compensates relative I/Q timing jitters within two sampling time intervals which, for the FOPEN III receiver, are 4 nanosecond. Graceful performance degradation of the algorithm is expected when timing jitter exceeds two sampling intervals. For example, phase jitter on the order of 5 sampling intervals will be partially but not perfectly corrected. Following the I/Q equalization, adaptive RFI rejection is performed. The FOPEN III data bandwidth may also be reduced 50% with hardly any information loss. The operation is allowed principally because of over-sampling; the FOPEN III A/D rate of 500 MHz exceeds the receiver bandwidth of 200 MHz by more than a factor of 2.

Figure 4:
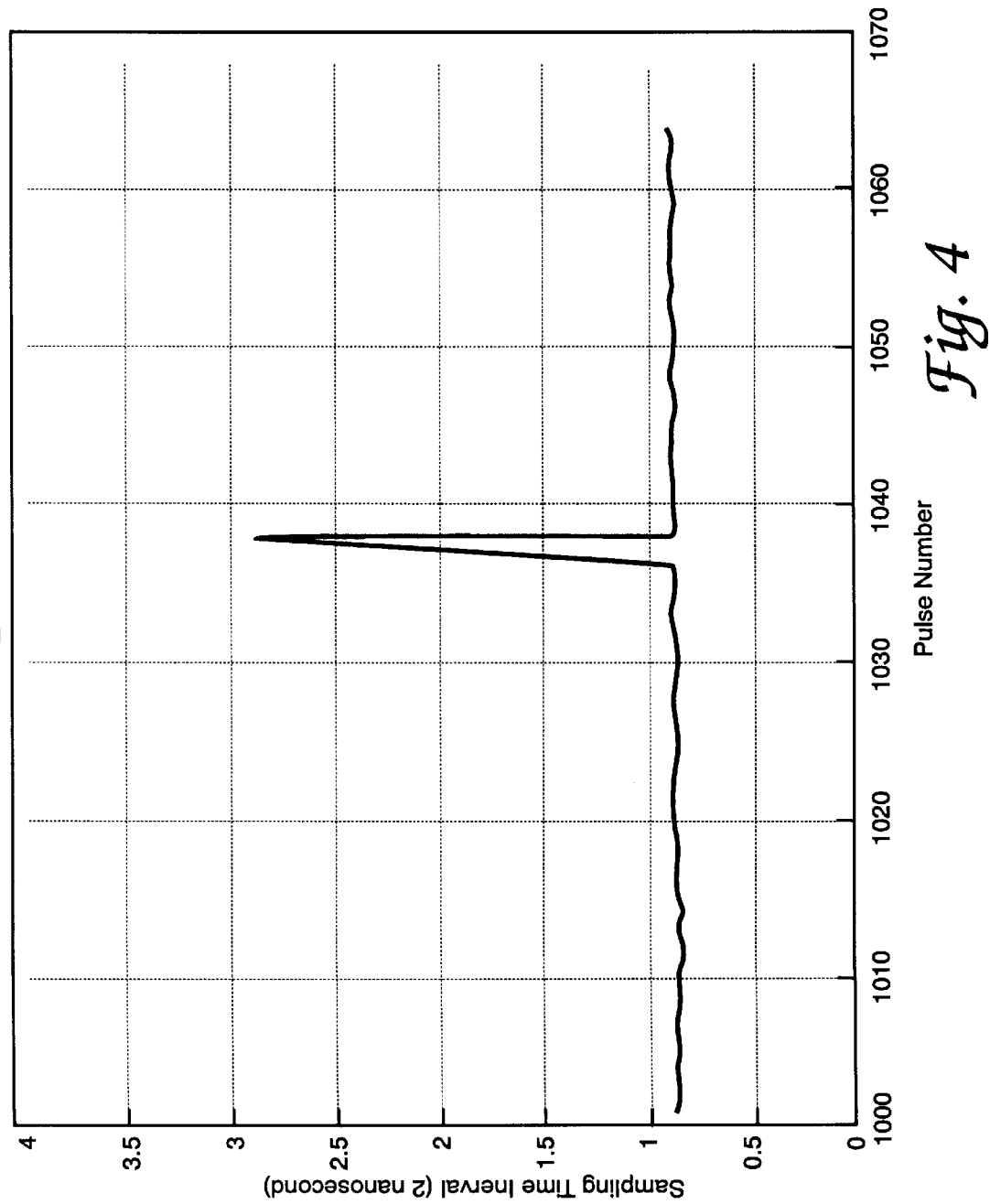
FIGS. 4 and 5 are charts of I/Q jitter.
Figure 5:
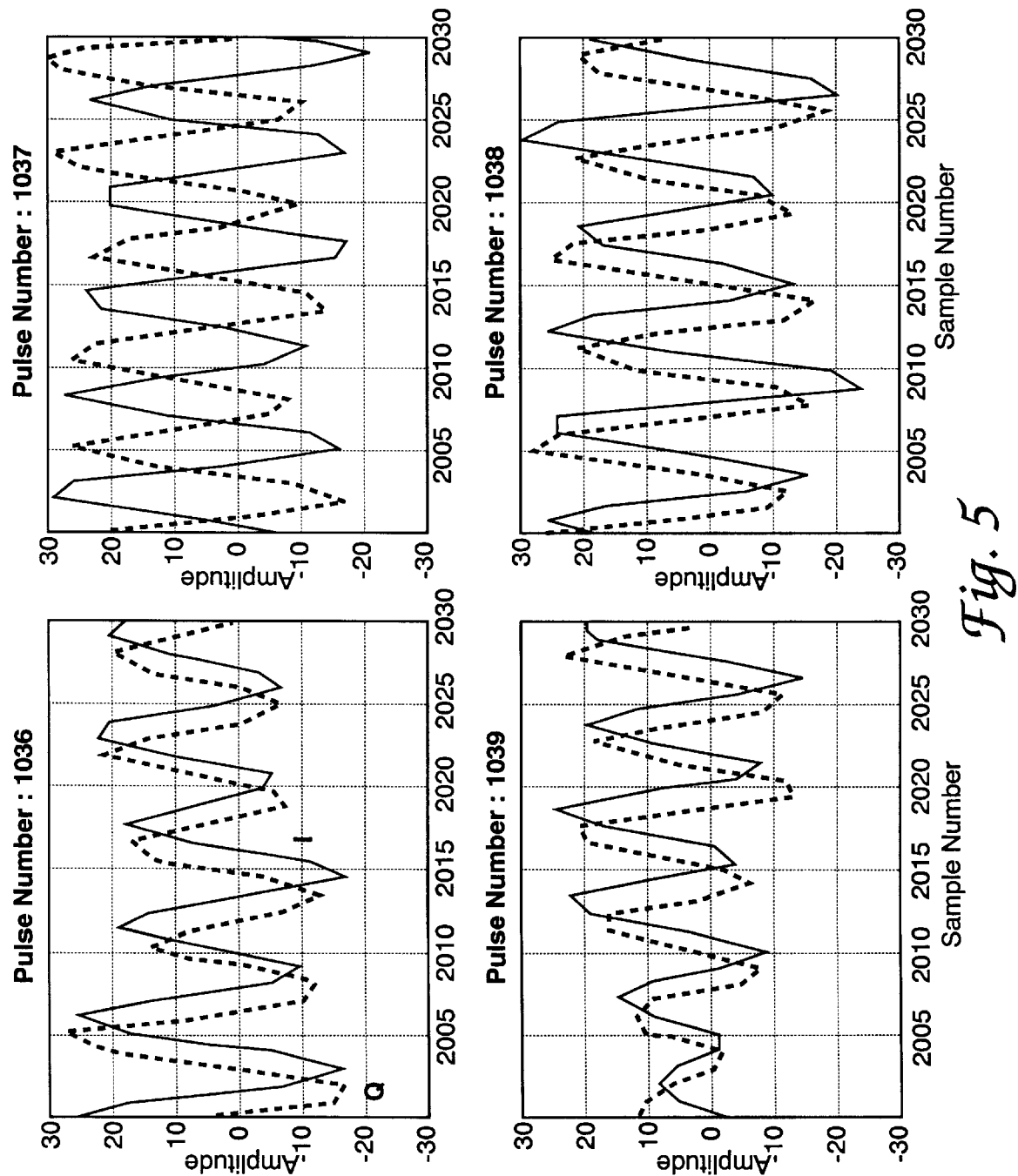
Figure 6:
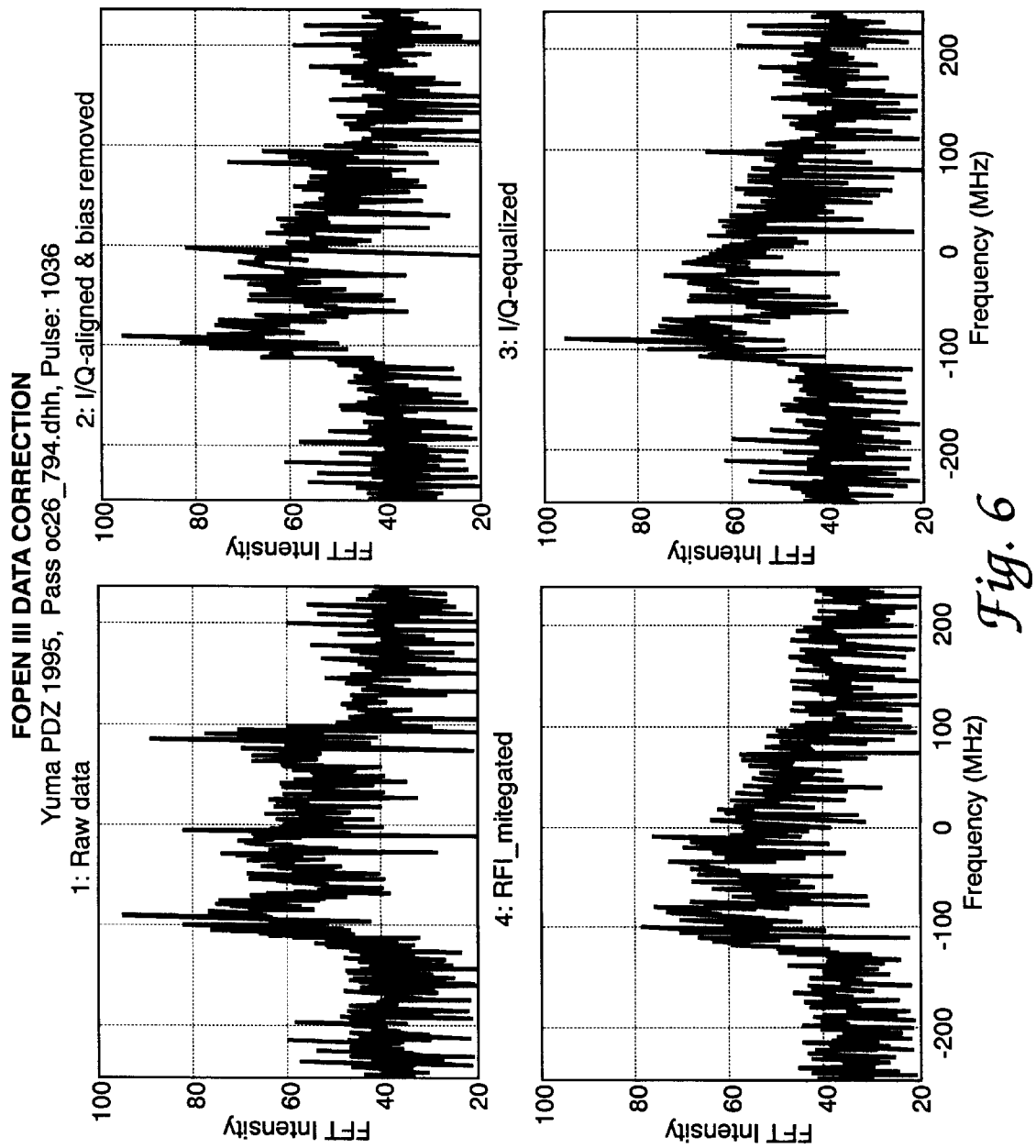
FIGS. 6 and 7 include 4 charts of data correction of FOPEN III data.
Figure 7:
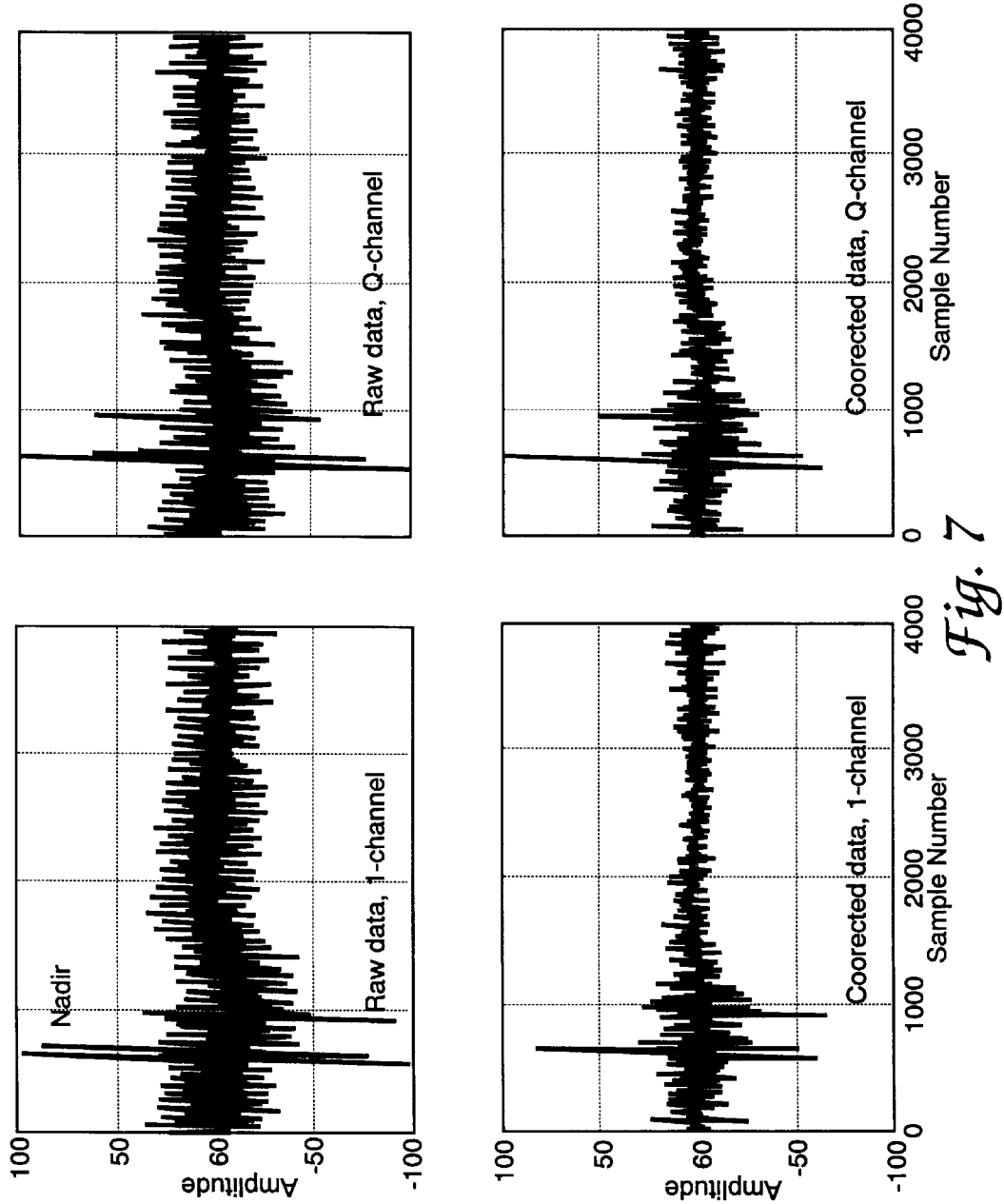

FIGS. 4 through 7 illustrate sample outputs of the data processing chain. FIG. 4 plots the estimated relative I/Q jitters by processing the pulse samples from No. 1001 to 1064 in the data file oc26_794.dhh. The average jitter of these pulses is 0.86 except for the pulse No. 1037, which is approximately 2.85, sampling time intervals. The random jump of jitter is clearly revealed by the plot of the data stream in FIG. 5. FIG. 5 depicts I/Q amplitudes of four pulse intervals from 1036 to 1039. Note that, for pulses 1036, 1038, and 1039, the I/Q data streams are displaced with an approximate phase difference of 90 degrees after a whole sample shift. In contrast, the I/Q range samples for the pulse 1037 is almost out of phase with each other. The spectra of the raw and several processed data streams for the pulse No. 1036 are shown in FIG. 6. Four plots of this figures trace the data spectra after I/Q alignment with whole-sample shift and range-bias removal, I/Q equalization, and RFI mitigation. The processed I/Q data streams, which are the inverse Fourier transform of the last spectrum, are shown in FIG. 7. FIG. 7 demonstrates that many data anomalies, including strong RFI modulation, have been successfully removed.

The I/Q equalization compensates the phase difference between I- and Q-channels due to random timing jitters. The signal processing principle is based on the observation that all raw SRI FOPEN III data gathered in 1995 are dominated by RFI tone modulations. The RFI spectral components are clearly shown by the raw data spectrum in FIG. 6 in the frequency range close to −100 MHz offset from the center frequency of 300 MHz. The strong and steady RFI tones provide beneficial opportunities to estimate and compensate the I/Q differential phase.

The I/Q phase compensation is carried out in the Fourier Transform domain as defined by the following equations. Suppose that a RFI component is characterized by $\exp(j\omega_0 t)$ such that its I- and Q-channel components are respectively given by $\cos(\omega_0 t)$ and $\sin(\omega_0 t)$ Also suppose, in the presence of timing error, the Q-channel leads the corresponding I-channel sampling time by $\tau$. Then, the spectral amplitudes of the I- and the Q-channel signals, $\cos(\omega_0 t)$ and $\sin[\omega_0(t-\tau)]$ will be respectively, $$S_I(\omega) = \tfrac{1}{2}[\delta(\omega-\omega_0)+\delta(\omega+\omega_0)], \ \omega\omega_0,$$

$$S_Q(\omega) = \exp(j\omega_0 \tau)\tfrac{1}{2+i} \ _j[\delta(\omega-\omega_0)-\delta(\omega+\omega_0)], \ \omega=\omega_0.$$

From the above two equations, the timing jitter $\tau$ can be estimated from the phase difference between the spectral components of $S_I(\omega)$ and $S_Q(\omega)$ at the offset frequency $\omega=\omega_0$. Using the estimated value of $\tau$, the Q-channel spectrum may be phase-compensated and the correct data spectrum is computed as $$S(\omega) = S_I(\omega) + \exp(-j\omega\tau) S_Q(\omega).$$

Adaptive RFI Mitigation

Figure 8:
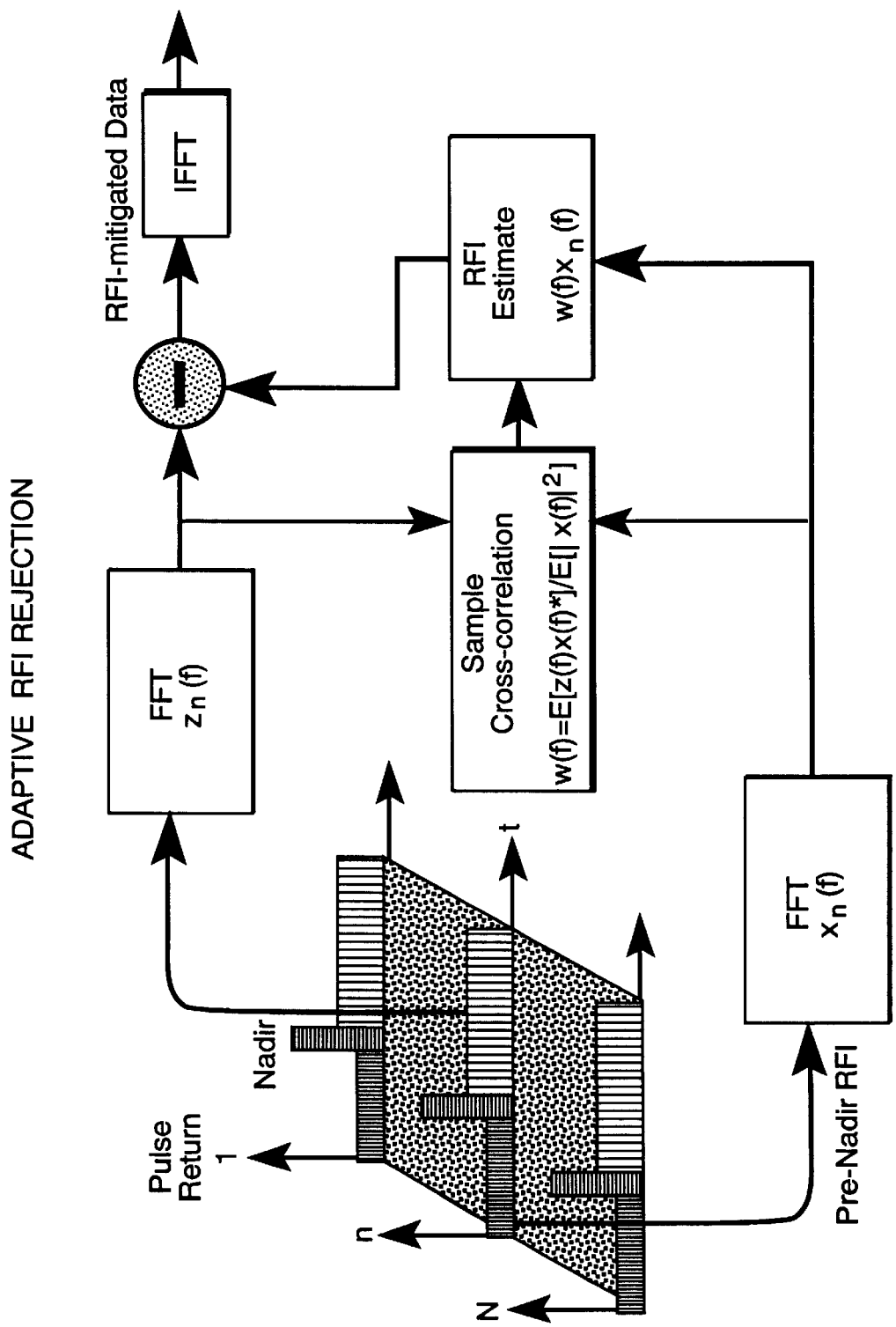
FIG. 8 is a block diagram of the adaptive RFI rejection
Figure 9:
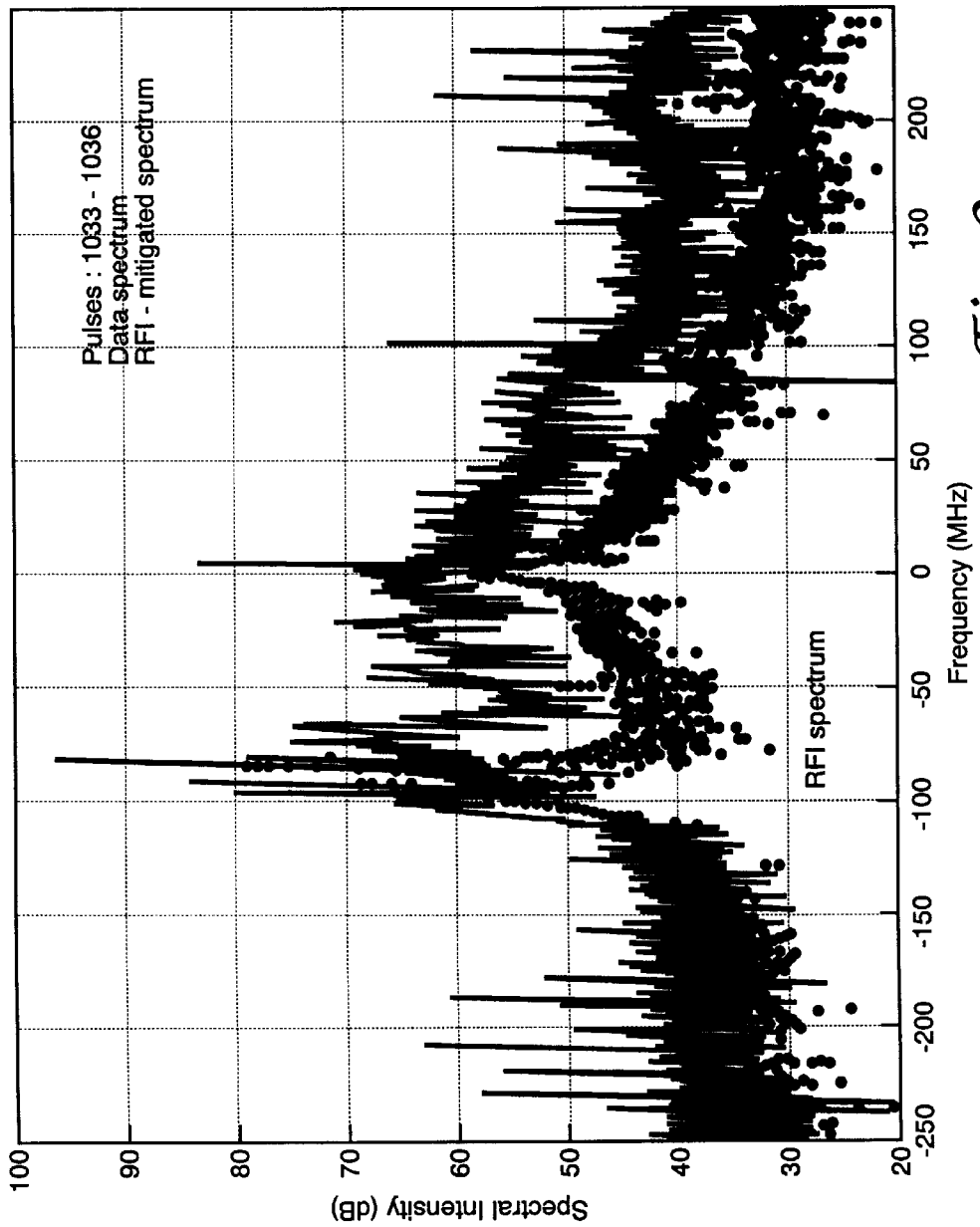
FIG. 9 is a chart of adaptive RFI mitigation.

The mathematical details of the adaptive RFI mitigation procedure have already been discussed. A block-diagram exposition of the signal processing approach is illustrated in FIG. 8. One sample result of RFI rejection is given by the FIG. 9. Three spectra are shown in this chart as processed from the data set oc26_794.dhh in the pulse intervais from No. 1033 through 1036. The black curve in FIG. 9 is the time-aligned and phase-compensated data spectrum. The curve marked by the red markers is the estimated RFI spectrum processed from per-nadir training data samples. The green curve is the RFI-rejected spectrum. Note that, all RFI tones have been canceled. Many strong RFI tones have been suppressed by more than 20 dB.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process for mitigating interference from inphase (I) and quadrature (Q) radar data comprising the steps of:

taking interference samples from pre-nadir radar data;

subtracting an interference estimate from the I and Q radar data; wherein the interference estimate is obtained as a spectral weighting function W(f) from the interference sampler averaged over N pulse intervals.

2. A process for mitigating interference from in phase (I) and quadrature (Q) radar data comprising the steps of:

an I/Q equalization step to estimate phase timing jitters between sets of I and Q radar data;

phase compensating an I/Q channel spectrum S(W) of the quadrature radar data to obtain a phase compensated data spectrum using:

$$S(\omega)=S_I(\omega)+\exp(-j\omega\tau)S_Q(\omega).$$

* * * * *